United States Patent
Ophir et al.

(10) Patent No.: US 7,082,170 B2
(45) Date of Patent: Jul. 25, 2006

(54) SPECTRAL POWER MANAGEMENT FOR CONSTRAINED TRANSMISSIONS USING CONSTELLATION SHAPING

(75) Inventors: Lior Ophir, Herzlia (IL); Liran Brecher, Kfar-Saba (IL)

(73) Assignee: Texas Instruments Incorporated, Dallas, TX (US)

( * ) Notice: Subject to any disclaimer, the term of this patent is extended or adjusted under 35 U.S.C. 154(b) by 812 days.

(21) Appl. No.: 10/144,408

(22) Filed: May 10, 2002

(65) Prior Publication Data

US 2003/0123564 A1 Jul. 3, 2003

Related U.S. Application Data

(60) Provisional application No. 60/343,651, filed on Dec. 28, 2001, provisional application No. 60/344,154, filed on Dec. 28, 2001.

(51) Int. Cl.
*H04L 25/03* (2006.01)
(52) U.S. Cl. ........................ 375/296; 375/265
(58) Field of Classification Search ........... 375/259, 375/265, 295, 296, 297
See application file for complete search history.

(56) References Cited

U.S. PATENT DOCUMENTS 5,774,500 A * 6/1998 Zogakis et al. ............ 375/261

6,553,063 B1 * 4/2003 Lin et al. ................. 375/223

FOREIGN PATENT DOCUMENTS

| EP | 0 383 632 A2 | 8/1990 |
| EP | 1 128 625 A1 | 8/2001 |

OTHER PUBLICATIONS

Ophir, Lior et al.; Spectral Power Management for Constrained Transmissions Using Precoding and Transmit Filter; Co-pending U.S. Patent Application filed on May 10, 2002.
Eyuboglu, M. Vedat, et al., "Trellis Precoding: Combined Coding, Precoding and Shaping for Intersymbol Interference Channels," IEEE Transactions on Information Theory, vol. 38, No. 2, Mar. 1992, Pt. I, New York, NY, US, pp. 301-314.
Forney, G. David, Jr., "Trellis Shaping," IEEE Transactions on Information Theory, vol. 38, No. 2, Mar. 1992, Pt. I, New York, NY, US, pp. 281-300.

* cited by examiner

*Primary Examiner*—Jay K. Patel
*Assistant Examiner*—David B. Lugo
(74) *Attorney, Agent, or Firm*—Abdul Zindani; W. James Brady, III; Frederick J. Telecky, Jr.

(57) ABSTRACT

In frequency channel communications, constraints on transmit power characteristics can be complied with by implementing constellation shaping (15, 71) in the transmitter. In transmitters which use transmit filtering (91) to comply with constraints on transmit power characteristics, the transmitter can also implement, upstream of the transmit filter, precoding (92) designed for a desired cooperation with the transmit filter.

32 Claims, 2 Drawing Sheets

US 7,082,170 B2

SPECTRAL POWER MANAGEMENT FOR CONSTRAINED TRANSMISSIONS USING CONSTELLATION SHAPING

This application claims the priority under 35 USC 119(e)(1) of U.S. provisional application Nos. 60/343,651 and 60/344,154, both filed on Dec. 28, 2001 now abandoned and both incorporated herein by reference.

FIELD OF THE INVENTION

The invention relates generally to frequency channel communications and, more particularly, to spectral power management in frequency channel communications.

BACKGROUND OF THE INVENTION

In various fields of communications, certain spectral requirements are imposed on transmitters due, for example, to regulatory limitations and/or interference considerations. In Home Phoneline networking (HomePNA), for example, these include: (1) FCC regulations, specifically part 15 (radiated emissions) and part 68 (conducted emissions), wherein the latter requires averaging the power over a period (time window) of 2 uS; (2) avoidance of audible noise in POTS (when apparent), which imposes peak constraints that seem to match the ones of part 68; and (3) avoidance of interference with HAM RF, wherein it is assumed that transmitting below −80 dBm/Hz in the HAM bands is sufficient.

Compatibility with FCC part 15 and 68 imposes constraints on the peak power, whereas the requirement to avoid interfering with HAM bands imposes requirements on the transmitted power in HAM bands (e.g. around 7 MHz). In the HomePNA2.0 specification, the foregoing requirements were met by the following solutions: using a PSD mask that complies with the FCC regulations and the HAM RF egress restrictions; normalizing the transmitted signal constellation according to the peak power (outermost symbols) to follow peak constraints; and using notch filters in the transmitter to comply with the power restrictions in the HAM bands. Normalizing the signal constellation according to the outermost symbols can cause a loss of up to 5 dB in large constellations. In the 256QAM constellation used in HPNA2.0, this imposes a loss of 4.23 dB. Using notch filters in the transmitter can result in a transmitted pulse that suffers from ISI and a longer impulse response, which in turn might degrade noise performance, and enhance error propagation in the receiver.

It is therefore desirable to provide spectral power management schemes that avoid undesired effects such as described above.

The invention attempts to avoid such undesired effects by implementing constellation shaping in the transmitter to support compliance with constraints on transmit power characteristics such as transmit power during a time window and/or transmit power in one or more predetermined frequency bands. Some embodiments of the invention provide preceding in the transmitter to avoid undesirable effects that can occur when special transmit filtering is used in the transmitter to comply with constraints such as constraints on transmit power in one or more frequency bands.

DETAILED DESCRIPTION

Figure 1:
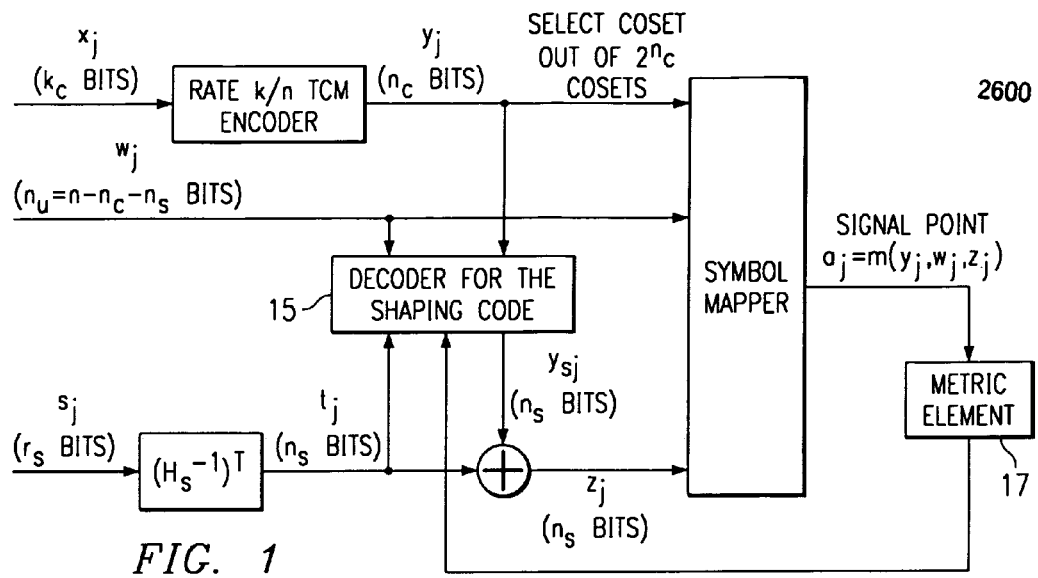
FIG. 1 diagrammatically illustrates pertinent portions of exemplary embodiments of a transmitter for frequency channel communications according to the invention.

The documents listed below are all incorporated by reference herein. Each document is hereinafter referred to by the corresponding number shown below in square brackets to the left of the document.

[1] "Trellis shaping," G. D. Forney IEEE Trans. Inf., Vol. 38, March 1992.

[2] "Trellis Precoding: combined coding, preceding and shaping for intersymbol interference channels," M. V. Eyuboglu, G. D. Forney, IEEE Trans. Inf., Vol. 38, March 1992.

[3] "On optimal shaping of multidimensional constellations," R. Laroia, N. Farvardin, S. A. Tretter, IEEE Trans. Inf., Vol. 40, July 1994.

[4] "New automatic equalizer employing modulo arithmetic," M. Tomlinson, Electron. Lett., Vol. 7, pp. 138–139, March 1971.

[5] "Trellis Precoding: combined coding, preceding and shaping for intersymbol interference channels," M. V. Eyuboglu, G. D. Forney, IEEE Trans. Inf., Vol. 38, March 1992.

[6] "A simple and effective precoding scheme for noise whitening on intersymbol interference channels," R. Laroia, S. A. Tretter, N. Farvardin, IEEE Trans. Commun., October 1993.

[7] ITU-T Recommendation, V.34, September 1992.

[8] "More on Convolutional Spectral Shaping," V. Eyuboglu, V.pcm Rapporteur Meeting, La Jolla, Calif., May 5–7, 1997.

[9] ITU-T Recommendation, V.90, September 1998.

FCC regulation part 68, for example, imposes a restriction on the transmitted power, when averaged on a 2 microsecond window. When the transmitted symbol rate is low, this might impose a restriction on each transmitted symbol, but as symbol rates increase, it is possible to select symbols such that, in each 2 microsecond window, the average power complies with the regulation. This may be done by using shaping (e.g. a variant of trellis shaping as in [1] or Convolutional spectral shaping as in [8]). The shaping operation permits the use of symbols that were not allowed by other methods (e.g. single symbol peak power constraints), which in turn results in better performance (e.g. higher throughput or better robustness to noise).

As indicated above, power constraints are often imposed in frequency bands that are close to or even within the frequency band of the desired transmission. For example, HAM bands in the 7 MHz range are within the 4–10 MHz frequency band used by HomePNA2.0. This problem arises also for VDSL. The aforementioned notch filter solution may introduce undesired inter-symbol interference (ISI), which in turn might degrade performance.

According to some embodiments of the invention, precoding (e.g. Tomlinson precoding as in [4] or Laroia preceding as in [6]) may be used before the notch filter to generate a spectrally shaped, non-ISI signal at the transmitter output. Other embodiments use a shaping technique (e.g. a variant of trellis shaping as in [1] or convolutional spectral shaping as in [8]) that imposes a spectral constraint on the designated HAM bands. In this manner, a sequence of transmitted symbols can be selected such that the power in the HAM bands is minimized.

Constellation shaping permits the stream of transmitted symbols in a communication system to be selected according to a criterion of minimum average power under the constraint of a given minimum distance between neighboring points. This "shapes" the constituent 2-dimensional constellation into a certain form (with a certain probability distribution between the constellation points). Thus, a symbol sequence with a lower average power (or alternatively a symbol sequence with a higher inter-symbol distance between neighboring points for a given power constraint) can be used. This results in "shaping gain" which can make the communication system more robust to noise and channel impairments, or result in higher achievable data-rates.

Two known methods of constellation shaping are trellis shaping as in [1] and shell mapping as in [3]. On Gaussian channels with inter-symbol interference (ISI), it is often desired to use preceding methods to mitigate channel distortion. Tomlinson-Harashima (TH) preceding as in [4] is a well known preceding scheme for ISI channels.

When constellation shaping is used in ISI channels, it can be advantageous to use a combination of shaping and preceding. A method of combining trellis shaping with TH-preceding, called trellis preceding, is described in [3]. Combining shell mapping with precoding can be done by incorporating Laroia preceding as described in [6]. In [1] and [2] it is shown that lattice codes can also be combined with trellis shaping and trellis preceding. Thus, trellis coded modulation (TCM) schemes can be combined with shaping and preceding to achieve coding gain together with shaping gain, and to have high performance even in ISI channels.

Lattice codes (e.g. TCM) can also be combined with shell mapping and Laroia preceding to achieve coding gain together with shaping gain, and to have high performance even in ISI channels. This is done, for example, in the ITU V.34 standard (see [7]) for voice grade modems.

In the ITU V.90 standard for voice grade modems (see [9]), convolutional spectral shaping as in [8] is used to spectrally shape the transmitted signal, or in other words, minimize the transmitted energy in predefined frequency bands. Notice that in the case of V.90 telephony modems, this band is the DC band (the requirement for minimizing the transmitter power results from the existence of transformers that stop the very low frequencies).

Figure 2:
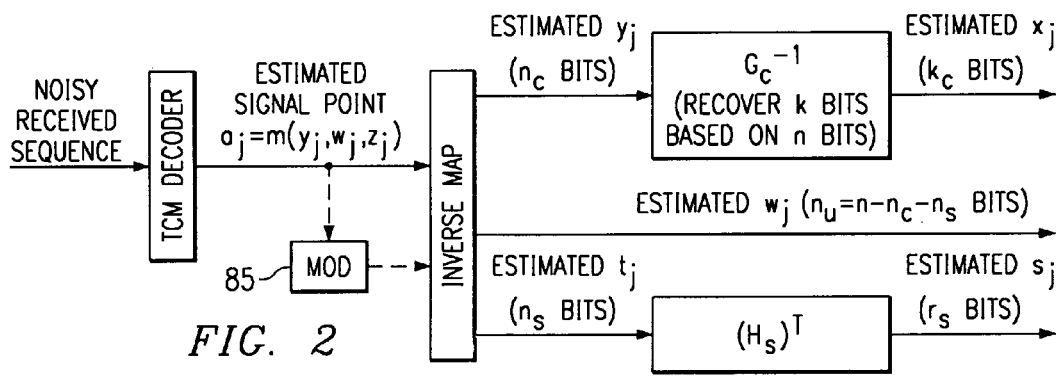
FIG. 2 diagrammatically illustrates pertinent portions of a conventional receiver apparatus which is capable of communicating with the transmitter of FIG. 1.

FIG. 1 and FIG. 2 respectively illustrate pertinent portions of exemplary embodiments of a transmitter and receiver for using trellis shaping for spectral management. Referring to FIG. 1, the input sequence is divided into three parts ($x_j$, $w_j$, $s_j$). The first part, $x_j$, a binary $k_c$-tuple, is an input to an encoder for a rate $k_c/n_c$ TCM code (or other type of lattice code). The second part, $w_j$, is an uncoded binary $n_u$ tuple. The third part, $s_j$, a syndrome $r_s$-tuple, is an input to an $r_s$ input, $n_s$ output coset representative generator $(H_s^{-1})^T$ for a rate $k_s/n_s$ convolutional shaping code, where $k_s=n_s-r_s$. The signals $t_j$, $w_j$ and $y_j$ are input to the decoder 15, whose output $y_{s,j}$ is summed with $t_j$ to produce $z_j$. The signals $w_j$, $y_j$ and $z_j$ are input to a symbol mapper. Except for the design of the metric element 17, the transmitter of FIG. 1 can have a conventional design, for example, generally following section III(A) of [1]. The decoder element 15 can, in conventional fashion, use the metric information output by the metric element 17. Thus, when the decoder element is implemented using a Viterbi algorithm (VA), the metric element is implemented per each branch. The design of the metric element can vary according to the desired spectral management criteria.

Referring to FIG. 2, and with the exception of the broken line portion (discussed in more detail hereinbelow), the illustrated receiver of FIG. 2 is conventional, and generally follows section III(C) of [1]. This receiver is operable in conventional fashion to receive (e.g. via conventional phone lines) communications from the transmitter of FIG. 1 (and the transmitters of FIGS. 7–9 below).

Figure 3:
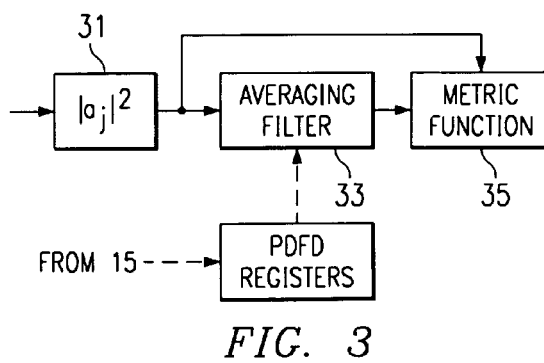
FIG. 3 diagrammatically illustrates exemplary embodiments of the metric element of FIG. 1.

For complying with restrictions on transmitted power over a time-window, FIG. 3 shows exemplary embodiments of the metric element 17 of FIG. 1. The magnitude squaring element 31 squares the magnitude of the signal point $a_j$ produced by the symbol mapper of FIG. 1, and thus calculates a measure of the transmit signal power. The averaging filter 33 may be given by:

$$avg_j = \frac{1}{N}\sum_{i=0}^{N-1} |a_{j-i}|^2$$

where N is the number of symbols used for the averaging function, and can be set according to the ratio between the time-window for the power constraint and the symbol interval. For example, if the symbol rate is 4 Mbaud, compliance with FCC part 68 (2 uSec window) yields N=8. The output of metric function 35 may be given by:

$$m_j = \begin{cases} \infty & avg_j > \text{Threshold} \\ |a_j|^2 & \text{otherwise} \end{cases}$$

where the Threshold value is set according to the power constraint.

The above example allows for trellis shaping, without permitting sequences of N consecutive symbols to have an average power greater than the predefined threshold. Notice that setting the metric function output to infinity is equivalent to disconnecting certain branches in the Viterbi algorithm (VA) implemented by the decoder 15 of FIG. 1. Further notice that for an averaging filter of length N, each state of the convolutional code associated with the VA of decoder 15 should be theoretically partitioned into $D^{(N-1)}$ states (D being the constellation size), according to all possible combinations of the last N−1 symbols (that yield a different value for the filter output). This can in turn yield a complex VA at 15 in FIG. 1.

To avoid such a complex VA, it is possible to use conventional reduced state sequence estimation (RSSE), for example parallel decision feedback decoding (PDFD, see [2]), i.e. to attach a shift register to every state of the decoder 15, each shift register holding the last N−1 symbol decisions associated with the corresponding state. Using these shift registers, the averaging filter output can be calculated, and negligible complexity enhancement is needed. Such a PDFD embodiment is shown by broken line in FIG. 3.

In some embodiments according to FIG. 3, a trellis shaped symbol sequence is obtained using 4 information bits per symbol (i.e., using a shaping constellation of 32-QAM), and an averaging filter with N=8.

Figure 4:
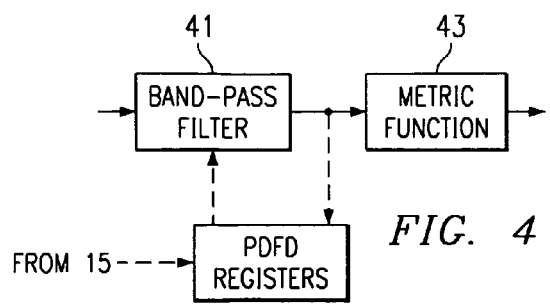
FIG. 4 diagrammatically illustrates further exemplary embodiments of the metric element of FIG. 1.

For complying with restrictions on transmit power over a frequency band, an exemplary embodiment of metric element 17 is given in FIG. 4. The output of the band pass filter 41 may be given by:

$$BPF_j = \sum_{i=0}^{L-1} b_i a_{j-i} - \sum_{i=1}^{K-1} d_i BPF_{j-i}$$

where b, d, K and L define the taps of the band pass filter. These tap parameters are set according to the frequency band in which the power constraint applies. The output of metric function 43 may be given by:

$$m_j = |BPF_j|^2$$

The FIG. 4 example allows for trellis shaping, wherein the power is calculated only in the frequency band in which the constraint applies. Notice that PDFD may also be used for implementing the BPF, by holding two registers attached to every state of decoder 15, the two registers of each state respectively holding the last L−1 symbol decisions and the last K−1 band pass filter outputs associated with the corresponding state. Using these shift registers, the BPF output can be calculated, and negligible complexity enhancement is needed. Such a PDFD embodiment is shown by broken line in FIG. 4.

In some embodiments according to FIG. 4, a trellis shaped symbol sequence is obtained using 4 information bits per symbol (i.e. using a shaping constellation of 32-QAM), and a $2^{nd}$ order Butterworth band pass filter.

Figure 5:
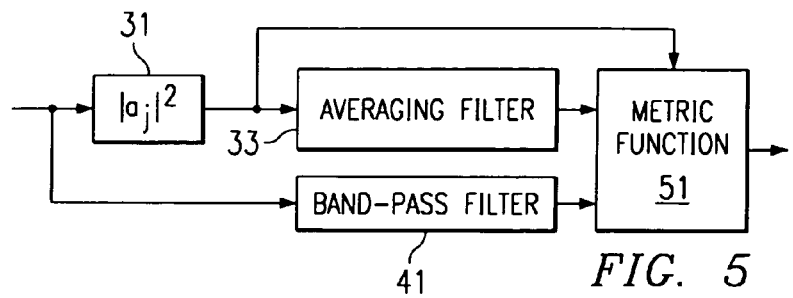
FIG. 5 diagrammatically illustrates further exemplary embodiments of the metric element of FIG. 1.

For complying with restrictions on both the transmitted power over a time-window as well as the transmitted power over a frequency band, an exemplary embodiment of metric element 17 is given in FIG. 5. The exemplary metric element of FIG. 5 includes the magnitude squaring element 31 and averaging filter 33 of FIG. 3, and the band pass filter 41 of FIG. 4. The output of metric function 51 may be given by:

$$m_j = \begin{cases} \infty & avg_j > \text{Threshold} \\ k_1|a_j|^2 + k_2 BPF_j & \text{otherwise} \end{cases}$$

where the Threshold value is set according to the power constraint, and the weighted sum coefficients $k_1$ and $k_2$ are set according to the desired proportions between shaping according to overall power (see FIG. 3) and shaping where the power is calculated only in the frequency band in which the constraint applies (see FIG. 4). The aforementioned coefficients can be determined, for example, empirically based on experimental observation or simulation under expected operating conditions. The FIG. 5 example allows for trellis shaping, without permitting sequences of N consecutive symbols to have a power greater than the predefined threshold. Although not explicitly shown, the aforementioned use of PDFD registers is also applicable to the embodiments of FIG. 5.

In some embodiments according to FIG. 5, a trellis shaped symbol sequence is obtained using 4 information bits per symbol (i.e. using a shaping constellation of 32-QAM), an averaging filter with N=8, a $2^{nd}$ order Butterworth band pass filter, and a metric function with $k_1$=0.1 and $k_2$=1.

Figure 6:
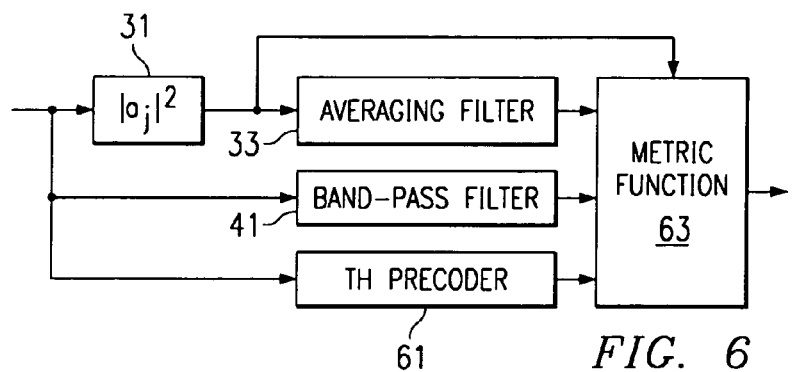
FIG. 6 diagrammatically illustrates further exemplary embodiments of the metric element of FIG. 1.

Some exemplary embodiments of the metric element 17 of FIG. 1 can also incorporate precoding (e.g., trellis precoding as in [2], using a TH-precoder). An exemplary metric element that incorporates precoding is shown in FIG. 6. The metric element of FIG. 6 includes a TH precoder 61, combined with the magnitude squaring element 31 and averaging filter 33 of FIG. 3, and the band pass filter 41 of FIG. 4.

The metric function 63 may be given by:

$$m_j = \begin{cases} \infty & avg_j > \text{Threshold} \\ k_4|a_j|^2 + k_5 BPF_j + k_3|TH_j|^2 & \text{otherwise} \end{cases}$$

where the Threshold value is set according to the power constraint, wherein the weighted sum coefficients $k_4$, $k_5$ and $k_3$ are set in a way that gives the desired proportions between (1) shaping according to overall power, (2) shaping where the power is calculated only in the frequency band in which the constraint applies, and (3) precoding, and wherein $TH_j$ is the precoder output. The aforementioned coefficients can be determined, for example, empirically based on experimental observation or simulation under expected operating conditions.

The FIG. 6 example allows for trellis shaping, without permitting sequences of N consecutive symbols to have a power greater than the predefined threshold.

Although not explicitly shown, the aforementioned use of PDFD registers is also applicable to the embodiments of FIG. 6, including the TH precoder portion. The use of PDFD with a precoder is described in [2]. As demonstrated in [1], shaping maybe combined with other schemes such as TCM, Turbo-TCM, and RS-coding.

Figure 7:
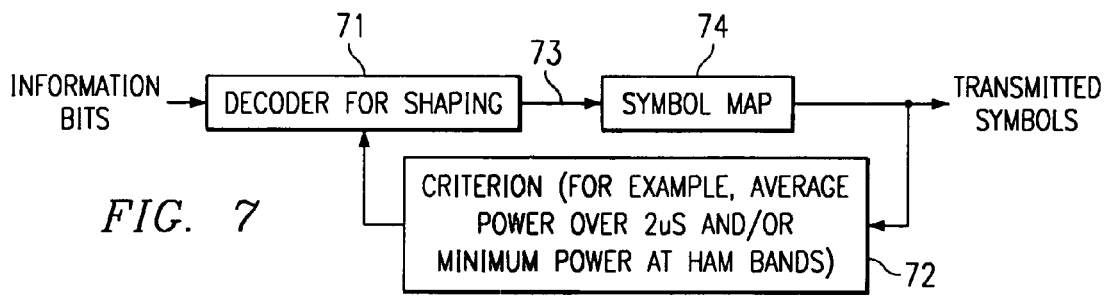
FIG. 7 diagrammatically illustrates pertinent portions of exemplary embodiments of a transmitter for frequency channel communications according to the invention.

FIG. 7 diagrammatically illustrates pertinent portions of exemplary embodiments of a transmitter that uses shaping techniques in the manner described generally above according to the invention. The shaping device, for example decoder element 71, is controlled by a shaping controller 72 according to a desired criterion. In some embodiments the criterion (or criteria) can be implemented, for example, by a metric element such as one of the exemplary metric elements described above relative to FIGS. 3–6. In such embodiments, the metric functions 35, 43, 51 and 63 serve as control information determiners that determine what control information will be applied to the shaping decoder. Any desired shaping method, for example, trellis shaping (see [1]) or convolutional spectral shaping (see [8] and [9]), can be implemented at 71. As described above, the criterion (or criteria) of the metric element ensures that the shaping operation at 71 produces shaped information bits at 73 that result (after mapping at 74) in a transmitted symbol stream according to the defined requirement(s).

As discussed above, when restrictions on the transmitted power over certain frequency bands apply, a special (e.g. notch) filter can be used in the transmitter to attenuate the signal in these bands. Exemplary transmitter embodiments according to the invention can reduce the ISI effect of these filters by using TH precoding upstream of the filter.

Figure 8:
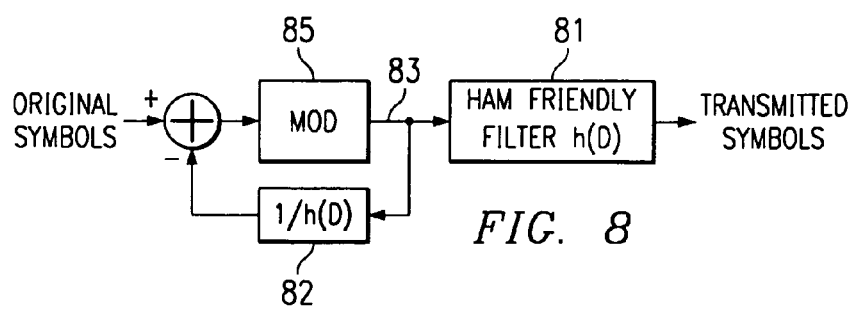
FIG. 8 diagrammatically illustrates pertinent portions of exemplary embodiments of a transmitter for frequency channel communications according to the invention.
Figure 9:
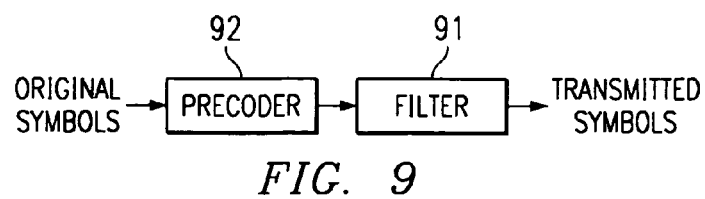
FIG. 9 diagrammatically illustrates pertinent portions of exemplary embodiments of a transmitter for frequency channel communications according to the invention.

A block diagram of exemplary transmitter embodiments according to the invention is shown in FIG. 8. The ISI introduced by the transmitter filter (e.g., a filter with notches for HAM bands) 81 is dealt with in the transmitter itself, so the equivalent channel seen by the receiver is less severe. Furthermore, this reduces the error propagation phenomenon when the receiver employs a DFE (decision feedback equalizer). The precoding filter 82 can be tailored for use with the known impulse response of the filter 81. For example, as shown in FIG. 8, filter 82 may be an estimate of the inverse (1/h(D)) of filter 81 (h(D)). In contrast, conventional applications of TH precoding typically tailor the precoder filter to the characteristics of the equivalent channel filter for the entire channel between transmitter and receiver.

In the transmitter of FIG. 8, the transmitter signal will have notches in the desired bands, but ISI can be avoided due to the TH precoder. The TH precoder includes a modulo function at 85 to fold signal points back into the constellation (according to conventional TH precoder operation), so the precoded symbols at 83 are within the selected constellation. A corresponding modulo function would be implemented in conventional fashion at the receiver, as shown by broken line in FIG. 2.

In other embodiments, different precoding schemes, e.g. Laroia precoding (see [6]), are used. This is shown generally in FIG. 9, where precoding is applied at 92, upstream of a specialized filter 91 in the transmitter.

The above-described embodiments may be implemented in many cases where restrictions on the transmitted power in certain frequency bands apply, such as in HomePNA or VDSL. It will be apparent to workers in the art that these embodiments can be readily implemented, for example, by suitable modifications of software, hardware, or both, in conventional transmitters and receivers, such as HomePNA and VDSL transmitters and receivers.

Although exemplary embodiments of the invention are described above in detail, this does not limit the scope of the invention, which can be practiced in a variety of embodiments.

What is claimed is:

1. A transmitter apparatus for performing frequency channel transmissions in compliance with a transmission constraint, comprising:

a shaping device having an input for receiving digital communication information, said shaping device including a control input for receiving control information corresponding to the transmission constraint, said shaping device responsive to said control information for performing a shaping operation on said communication information to produce shaped communication information;

a symbol mapper coupled to said shaping device for mapping said shaped communication information into a sequence of symbols for transmission across a frequency channel; and a shaping controller coupled to said symbol mapper and said control input of said shaping device, said shaping controller responsive to said sequence of symbols for producing said control information for said shaping device, wherein said shaping device includes a shaping decoder.

2. The apparatus of claim 1, wherein said shaping decoder implements a Viterbi algorithm.

3. The apparatus of claim 1, wherein said shaping decoder is a trellis shaping decoder.

4. The apparatus of claim 1, wherein said shaping decoder is a convolutional spectral shaping decoder.

5. The apparatus of claim 1, wherein said transmission constraint includes a constraint on transmit power during a time window.

6. The apparatus of claim 1, wherein said transmission constraint includes a constraint on transmit power in a frequency band.

7. The apparatus of claim 1, wherein said shaping controller includes an averager for determining time-averaged transmit power information associated with the sequence of symbols, and a control information determiner coupled to said averager and responsive to said time-averaged transmit power information for determining said control information.

8. The apparatus of claim 1, wherein said shaping controller includes a power calculator for calculating transmit power information associated with the sequence of symbols, and said control information includes said transmit power information.

9. The apparatus of claim 8, wherein said shaping controller includes a band pass filter for performing a band pass filter operation on the sequence of symbols to produce band pass-filtered information, and said control information includes said band pass-filtered information.

10. The apparatus of claim 9, wherein said shaping controller includes a precoder for performing a precoding operation on the sequence of symbols to produce precoded information, and said control information includes said precoded information.

11. The apparatus of claim 10, wherein said shaping controller includes an averager coupled to said power calculator for determining time-averaged transmit power information associated with the sequence of symbols, and a control information determiner coupled to said avenger for determining said control information in response to said time averaged transmit power information, said control information determiner coupled to said power calculator, said band pass filter, and said precoder.

12. The apparatus of claim 8, wherein said shaping controller includes a precoder for performing a precoding operation on the sequence of symbols to produce precoded information, and said control information includes said precoded information.

13. The apparatus of claim 1, wherein said shaping controller includes a band pass filter for performing a band pass filter operation on the sequence of symbols to produce band pass-filtered information, and wherein said control information includes said band pass-filtered information.

14. The apparatus of claim 13, wherein said band pass filter includes a Butterworth filter.

15. The apparatus of claim 1, wherein said shaping controller includes a precoder for performing a precoding operation on the sequence of symbols to produce precoded information, and said control information includes said precoded information.

16. The apparatus of claim 15, wherein said shaping controller includes a band pass filter for performing a band pass filter operation on the sequence of symbols to produce band pass-filtered information, and wherein said control information includes said band pass-filtered information.

17. The apparatus of claim 15, wherein said precoder includes a TH precoder.

18. The apparatus of claim 1, provided as one of a HomePNA transmitter and a VDSL transmitter.

19. The apparatus of claim 1, wherein said shaping device includes a shaping decoder that implements reduced state sequence estimation.

20. The apparatus of claim 1, wherein said shaping device includes a shaping decoder that implements parallel decision feedback decoding.

21. A method for complying with a constraint on frequency channel transmissions, comprising:
   in response to control information corresponding to the transmission constraint, performing a shaping operation on communication information to produce shaped communication information;
   mapping the shaped communication information into a sequence of symbols for transmission across a frequency channel; and
   producing the control information in response to the sequence of symbols, wherein the constraint includes a constraint on one of transmit power during a time window and transmit power in a frequency band.

22. The method of claim 21, wherein said shaping step includes implementing one of a Viterbi algorithm and reduced state sequence estimation.

23. The method of claim 21, wherein said shaping step includes performing one of a trellis shaping operation and a convolutional spectral shaping operation.

24. The method of claim 21, wherein said producing step includes determining time-averaged transmit power information associated with the sequence of symbols, and determining said control information in response to said time-averaged transmit power information.

25. The method of claim 21, wherein said producing step includes calculating transmit power information associated with the sequence of symbols, and wherein said control information includes the transmit power information.

26. The method of claim 25, wherein said producing step includes performing a band pass filter operation on the sequence of symbols to produce band pass-filtered information, and wherein said control information includes the band pass-filtered information.

27. The method of claim 21, wherein said producing step includes performing a precoding operation on the sequence of symbols to produce precoded information, and wherein said control information includes the precoded information.

28. The method of claim 27, wherein said producing step includes calculating transmit power information associated with the sequence of symbols, and wherein said control information includes the transmit power information.

29. The method of claim 28, wherein said producing step includes performing a band pass filter operation on the sequence of symbols to produce band pass-filtered information, and wherein said control information includes the band pass-filtered information.

30. The method of claim 29, wherein said producing step includes determining time-averaged transmit power information associated with the sequence of symbols, and determining said control information in response to said time-averaged transmit power information.

31. The method of claim 27, wherein said producing step includes performing a band pass filter operation on the sequence of symbols to produce band pass-filtered information, and wherein said control information includes the band pass-filtered information.

32. The method of claim 21, wherein said producing step includes performing a band pass filter operation on the sequence of symbols to produce band pass-filtered information, and wherein said control information includes the band pass-filtered information.

* * * * *